United States Patent [19]

Lehman et al.

[11] Patent Number: 4,519,703

[45] Date of Patent: May 28, 1985

[54] DOCUMENT REPRODUCTION DEVICE UTILIZING A SELECTIVE COLOR ILLUMINATOR

[75] Inventors: Richard F. Lehman, Fairport; Roland W. Porth, Rochester; Lawrence J. Mason, Penfield, all of N.Y.

[73] Assignee: Xerox Corporation, Stamford, Conn.

[21] Appl. No.: 514,372

[22] Filed: Jul. 15, 1983

[51] Int. Cl.³ ............................................. G03B 27/72
[52] U.S. Cl. ...................................... 355/69; 355/37; 355/70; 355/71
[58] Field of Search ................. 355/35, 37, 38, 69, 355/70, 71

[56] References Cited

U.S. PATENT DOCUMENTS

| 3,825,335 | 7/1974 | Reynolds | 355/37 |
| 3,841,752 | 10/1974 | Terajima et al. | 355/4 |
| 3,950,093 | 4/1976 | Schneider | 355/37 |
| 4,124,292 | 11/1978 | Van Wandelen | 355/37 |

Primary Examiner—Monroe H. Hayes

[57] ABSTRACT

A selective color copyability illuminator includes a pair of lamps having complementary spectral emission. The ratio of the lamp outputs are adjustable to enhance a first color of an original to be copied while suppressing the second color. The power input to the lamps is also continually adjustable to maintain a desired exposure level at an imaging plane. In a preferred embodiment, a dichroic reflector is utilized with each lamp to enhance system efficiency.

4 Claims, 5 Drawing Figures

DOCUMENT REPRODUCTION DEVICE UTILIZING A SELECTIVE COLOR ILLUMINATOR

This invention relates generally to a document reproduction device, and more particularly to a selective color illuminating system to be utilized in such a device.

It is a goal of a non-color reproduction device (e.g. a copier or printer which produces black and white copies of an original) to be able to reproduce colored originals as well as black and white original documents. The ability of a reproduction device to do so is a function of the spectral response of the device and the spectral reflectance of the colors of the original document. The spectral response is determined by the properties of the illumination source used to illuminate the original document and the properties of the photosensitive imaging member (photoreceptor drum or belt).

According to one aspect of the invention, the copyability of colored originals is selectively enhanced by using two lamps as the illumination source and by adjusting the ratio of the lamp outputs according to the dominant colors present in the original. At the same time, the power to the lamps is adjusted by a feedback circuit so that the exposure level at the imaging plane is maintained constant.

More specifically, the invention is directed to a reproduction device including an illumination system for illuminating an original document lying in an object plane, said illumination system comprising a first and second lamp placed on opposite sides of a scan strip on said object plane, said first lamp adapted to direct a band of light of a first spectral emission to said scan strip, said second lamp adapted to direct a band of light of a second spectral emission complementary to said first emission, to said scan strip, means for projecting an image of said document onto a photosensitive image plane, and means for adjusting the ratio of said first and second emissions, said means further adapted to maintain a constant exposure level at said image plane.

In one embodiment, a pair of dichroic reflectors are positioned in the path of the two lamps, each reflector designed to transmit the emission of the associated lamp but to reflect the emission of the complementary lamp.

DESCRIPTION

Figure 1:
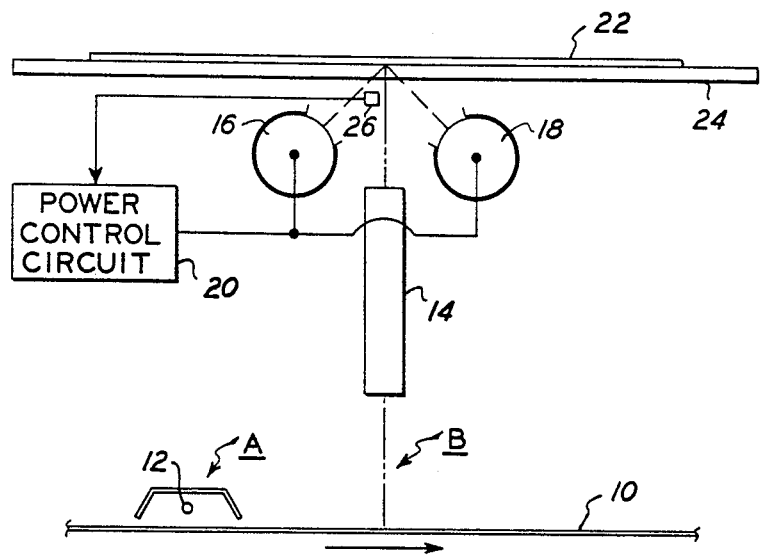
FIG. 1 is a schematic diagram of a document reproduction system utilizing the illumination system of the invention.

Referring now to FIG. 1, there is shown a schematic illustration of an automatic xerographic reproducing device for making black and white copies from either a black and white or a colored original document utilizing the illumination system of the present invention. As will become clear from the disclosure below, the instant invention is suited for use in a wide variety of copying or printing machines and the teachings herein embodied are not necessarily restricted to the particular machine environment disclosed. Basically, the xerographic reproducing apparatus employs a photoreceptor belt 10 which is preferably formed of a material having a relatively panchromatic response to visible light. The belt is arranged to move sequentially through a series of processing stations in the direction indicated. The belt first passes through a charging station A in which is located a corona generating device 12 extending transversely across the belt surface and which is arranged to bring the photoconductive surface to a relatively high uniform charge potential.

Belt 10 is next transported through an exposure station B which includes a gradient index lens array 14 and a pair of fluorescent lamps 16, 18 having complementary spectral emissions. Power to the lamps is provided by control circuit 20 to be described in further detail below. An original document 22 is supported upon a transparent platen 24. Platen 24 is adapted to move through the exposure zone so as to enable successive areas of original 22 to be illuminated by the combined emission of lamps 16, 18. A scanned image line is transmitted through lens array 14 and focused at the surface of belt 10. Platen 24 moves in timed relation with belt 10 to create a flowing light image on the belt surface. Alternatively, the platen can be held stationary and the lamps and lens array moved to provide the scanning function as is known in the art. Photodetector 26 is located in a position near the platen so as to sample the illumination level near the platen surface. The output signal generated by photodetector 26 is sent to circuit 20 and is used to adjust the power inputs to the lamps so as to maintain the illumination level at some predetermined value appropriate to the specific system.

Following the recording of the document image on the belt, the latent image is developed and transferred to an output sheet by techniques well known in the art, and whose details are therefore omitted.

Examining in greater detail the illumination system of FIG. 1, lamps 16 and 18 are apertured lamps having diffusely reflecting coatings on the interior non-apertured areas to enhance brightness. According to the invention, lamps 16 and 18 can provide a continuous range of color copyability through adjustment of the ratios of the output of one lamp to that of the second lamp.

Lamp 16 has been constructed with a red-emitting phosphor coating so as to provide an emission in the red wavelength region. Lamp 18 is constructed with a blue phosphor to provide an emission in the blue wavelength region. Power to both lamps is provided by a high frequency power supply 27 contained within circuit 20.

As a first example, if the original to be copied is a black and white document, power control circuit 20 would operate the lamps at substantially equal output levels and at sufficient power to provide optimum exposure at photoreceptor 10. If the original document is dominated by red colors, circuit 20 would be manually adjusted so that the output ratio of lamp 16 to 18 would be low. Lamp 18 emission would be increased and lamp 16 emission would be decreased to selectivity enhance the copyability of the red color. Photodetector 26 would sense a change in the combined lamp emission output and send a signal to the power supply calling for increased power input to raise the output level of both lamps until the desired exposure level has been reached.

If document 22 is dominated by blue colors, the emission of lamp 16 is increased and lamp 18 decreased so as to enhance blue copyability while suppressing red copyability. The ratio output adjustments may be performed manually, based initially on trial and error but the operator should become familiar with the control techniques after a period of time and optimize selection of the appropriate ratio.

Figure 2:
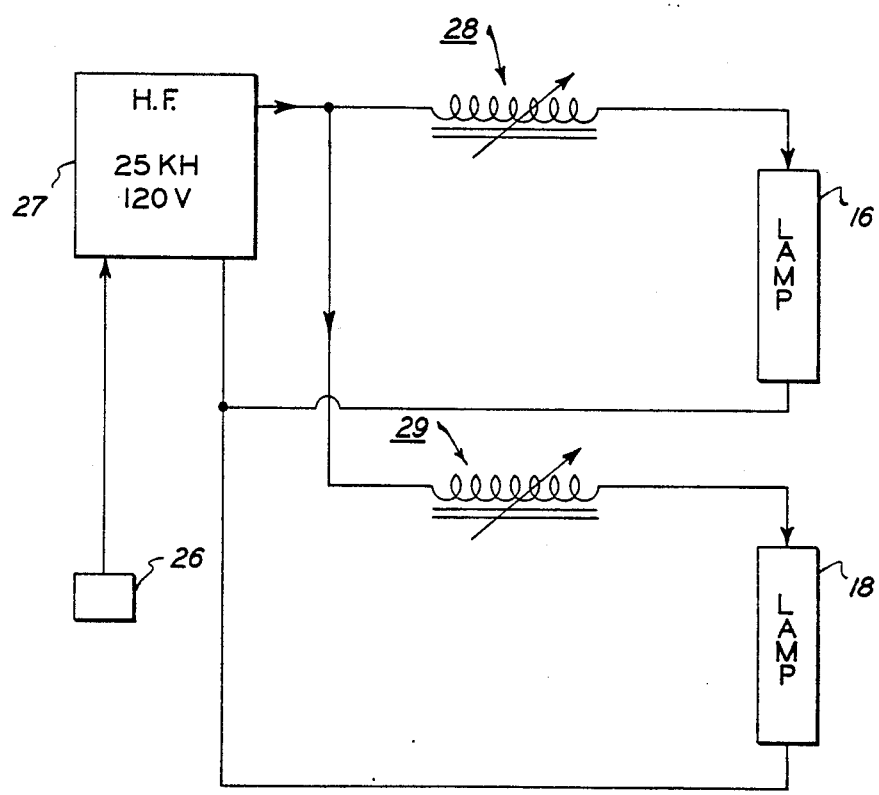
FIG. 2 is a schematic block diagram of the power control circuit controlling illumination output.
Figure 3:
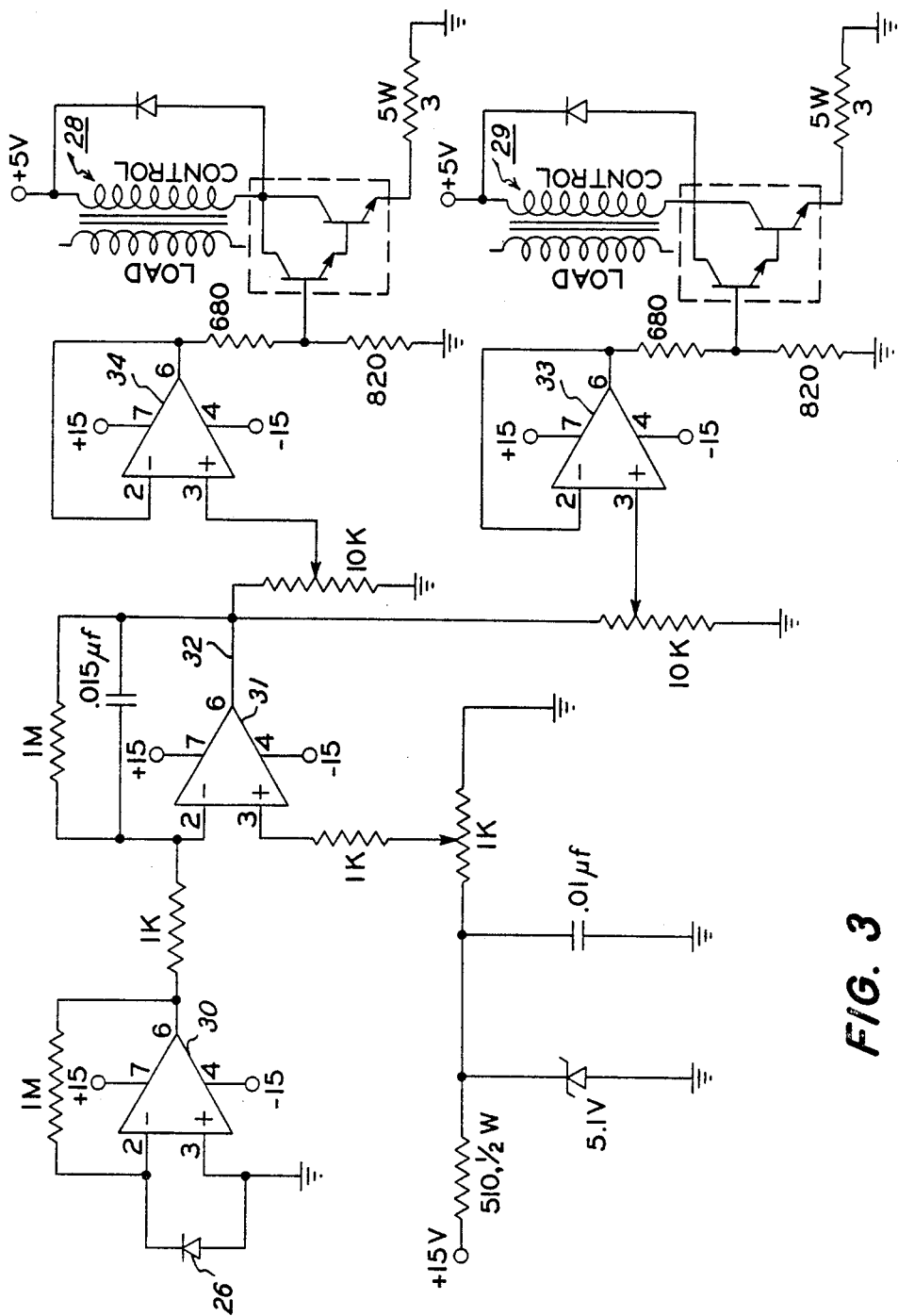
FIG. 3 is a detailed schematic power control circuit of FIG. 2.

Power supply circuit 20 is shown in block form in FIG. 2 and in a more detailed schematic form in FIG. 3. Referring to FIG. 2 power supply 27 is a high frequency (25 KH), 120 V power supply operating over a wide dynamic range. The power supply supplies power to lamps 16, 18 which can be standard T8, fluorescent lamps, operating in the range of 1 to 2 amps via saturable reactors 28, 29 in series with each lamp.

In operation and referring to FIG. 3, the combined lamp outputs are sensed by photosensor 26, amplified by amplifier 30, and filtered by amplifier 31 to produce a dc signal at output 32. This dc signal is applied to current drivers 33, 34 whose outputs control the current through saturable reactors 28, 29 respectively. By rationing the voltage input to each current driven, the saturable reactor control currents can be set to different values and thus, the lamps 16, 18 current will also be set to different values. A 50/1 lamp current ratio has been obtained with the circuit of FIG. 3.

Figure 4:
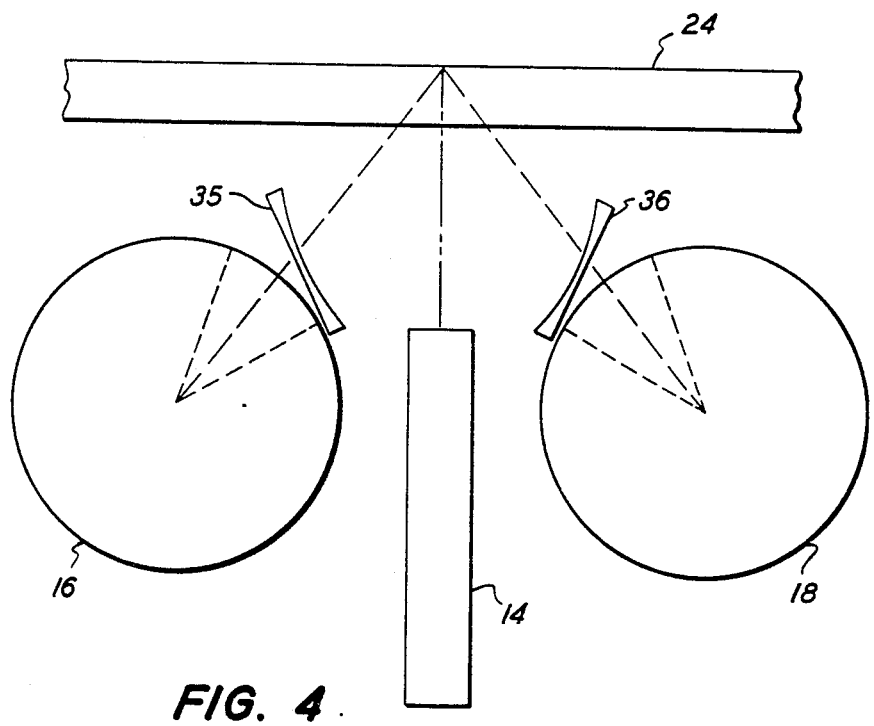
FIG. 4 shows a second embodiment of the invention utilizing a pair of dichroic reflectors to enhance efficiency.
Figure 5:
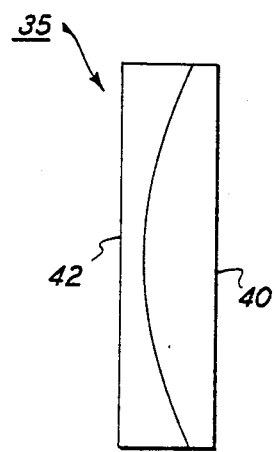
FIG. 5 shows a preferred construction for the dichroic reflectors.

The illumination system shown in FIG. 1 operates quite efficiently for the particular system illustrated since the lamps are positioned fairly close to each other to provide the narrow exposure slit required for gradient index lens imaging. Light from one lamp enters the other and is reflected from the diffuse coating to increase the radiance of each lamp. The illumination system can be made even more efficient if some of the stray light being lost in the areas between the lamps and the platen could be redirected. FIG. 4 shows a second embodiment in which a pair of dichroic reflectors 35, 36 are positioned so as to extend above and across the aperture of each lamp. Each reflector is designed to transmit the light of the associated lamp but to reflect the light from the opposing lamp. Thus, in the previous example, if lamp 16 has an emission in the red wavelength, reflector 35 is designed to transmit the red light of lamp 16 but reflect the blue light of lamp 18. Reflector 36 is designed to transmit the blue light of lamp 18 and reflect the red light of lamp 16. Thus both reflectors would be simultaneously effective in reflecting the light of the opposing lamps. FIG. 5 illustrates a preferred construction for the dichroic reflector in which optical power in transmittance is minimized. This is accomplished by laminating two transparent materials 40, 42 such that the bulk of the optical power is eliminated in the transmittance mode. The curvature of the surface is adjusted to compensate for power of the fill material.

In conclusion, it may be seen that there has been disclosed a novel document imaging system. The exemplary embodiments described herein are presently preferred, however, it is contemplated that further variations and modifications within the purview of those skilled in the art can be made herein. For example, the above control system may be used to completely suppress foreground information, i.e. to delete an image of a specific color or to compensate for colored background, i.e. to use blue lamps for blue backgrounds.

And while the projection system comprised a linear, gradient index transmitter, the invention may be utilized with other, conventional nonlinear projection lenses. Further, while the lamps in the illustrated embodiment were apertured fluorescent lamps, other types of lamps may be used, such as filtered tungsten. The following claims are intended to cover all such variations and modifications as fall within the spirit and scope of the invention.

What is claimed is:

1. A document reproduction device including an illumination system for illuminating an original document lying in an object plane;

said illumination system comprising a first and second lamp placed on opposite sides of a scan strip on said object plane;

said first lamp adapted to direct a band of light of a first spectral emission to a linear scan strip, said second lamp adapted to direct a band of light of a second spectral emission, complementary to said first emission, to said scan strip;

means for projecting an image of said document onto a photosensitive image plane;

manually adjustable means for adjusting the ratio of said first and second lamp emissions so as to enhance the copyability of a document dominated by a specific color, said adjustment resulting in a change in illumination level at said object plane;

a photosensor for detecting the illumination level at said object plane and for generating an output signal representative of a change of said level; and electrical means responsive to said photosensor output signal to adjust the power input to said lamps so as to maintain a desired illumination level.

2. The illumination system of claim 1 further including a first dichroic reflector positioned in the emission path of said first lamp, said first reflector adapted to transmit the emission of said first lamp but to reflect the emission of said second lamp, and a second dichroic reflector positioned in the emission path of said second reflector and adapted to transmit the emission of said second lamp but to reflect the emission of said first lamp.

3. The illumination system of claim 2 wherein said dichroic reflectors comprise a unitary member devoid of power when operated in the transmission mode.

4. A document reproduction imaging system including an illumination system for illuminating an original document lying in an object plane, said illumination system comprising a first and second lamp placed on opposite sides of a scan strip on said object plane, said first lamp adapted to direct a band of light of a first spectral emission to said scan strip, said second lamp adapted to direct a band of light of a second spectral emission complementary to said first emission, to said scan strip, a first dichroic reflector positioned in the emission path of said first lamp, said first reflector adapted to transmit the emission of said first lamp but to reflect the emission of said second lamp, and a second dichroic reflector positioned in the emission path of said second reflector and adapted to transmit the emission of said second lamp but to reflect the emission of said first lamp.

* * * * *